Sept. 25, 1951     D. B. BRADNER ET AL     2,569,367
ENDLESS METAL BELT AND METHOD OF MAKING THE SAME
Filed Jan. 8, 1946     3 Sheets-Sheet 1

INVENTORS
Donald B. Bradner
BY William B. Stoddard, Jr.
Philip S. Chickensderfer
Frederick G.L. Cary ATTORNEY Sept. 25, 1951 D. B. BRADNER ET AL 2,569,367
ENDLESS METAL BELT AND METHOD OF MAKING THE SAME
Filed Jan. 8, 1946 3 Sheets-Sheet 3

INVENTORS
Donald B. Bradner
BY William B. Stoddard, Jr.
Philip S. Clickensderfer
Frederick L. Bauer ATTORNEY

Patented Sept. 25, 1951

2,569,367

UNITED STATES PATENT OFFICE

2,569,367

ENDLESS METAL BELT AND METHOD OF MAKING THE SAME

Donald B. Bradner, Washington, D. C., and William B. Stoddard, Jr., and Philip S. Blickensderfer, Hamilton, Ohio, assignors to The Champion Paper and Fibre Company, Hamilton, Ohio, a corporation of Ohio Application January 8, 1946, Serial No. 639,866

13 Claims. (Cl. 74—232)

This invention relates to endless bands or belts of metal and methods of making the same. It has particular reference to endless belts for use in the manufacture of cast cellulosic, resinous, or other films, and of cast surfaced coated paper such as that described in Patent No. 1,719,166, dated July 2, 1929, to Bradner. It is herein disclosed as embodied in an endless belt of nickel (which metal possesses properties of strength, hardness, and corrosion resistance which are particularly desirable in belts for these uses) and in a method of making the same.

In such casting processes it has heretofore been common practice to use rotating drums for the casting surface, notwithstanding certain inherent limitations possessed by the drums, which can be obviated by the use of endless belts. Efforts have been made for a number of years to produce endless metal belts having satisfactory characteristics for this purpose, but so far as we are aware the methods used have not served to produce belts having the corrosion resistance, hardness, straightness, flatness, or the degree of uniformity of thickness, strength, stiffness, and surface characteristics combined with the length and width required to render such belts practically useful in many of the aforesaid casting processes.

One of the principal defects in belts as heretofore manufactured for use as casting surfaces in processes of the character described above is that when they were made of metals having the properties required for a casting surface, the joint between the ends of the metal strip necessary to make an endless belt, produced at that point in the belt a difference in some property of the belt which resulted in an objectionable difference in the surface of the composition cast on the belt. In the above mentioned processes, particularly in the manufacture of cast surfaced coated paper, minute blemishes in the casting surface, and even minute departures from the intended plane of travel of the casting surface such as result from variations in thickness, flexibility, or flatness of the belt, will produce manifest defects in the coated paper cast on the surface.

The belt of the present invention has a hard, smooth outer surface and is preferably formed throughout of metal electrolytically deposited in place, as herein set forth, and may be made substantially uniform in thickness, strength, and other physical properties, and in its surface characteristics, throughout its extent, substantially free from internal stresses such as are caused by localized heating in welding, brazing, etc., and free from any surface discontinuities due to the joining of the ends of a strip to give the belt an endless form. Such a belt may be produced by first electroforming a strip of metal, advantageously nickel, on a rotating cylindrical cathode. If the surface of the cathode is hard, smooth, highly polished, and properly prepared as hereinafter set forth, the surface of nickel strip formed thereon is characteristic of metallic surfaces formed on polished non-adhering cathodes and, if the deposition of nickel has been properly controlled as hereinafter set forth, has the hardness, smoothness, and brightness desired in casting surfaces. This surface is then preferably used as the outer or casting surface of the belt and may be used as formed or additionally polished as desired.

The ends of this strip are then trimmed, abutted, and aligned, and temporarily but firmly fastened in the relative positions which they are to occupy in the finished belt. The abutted and firmly-held ends are electrolytically prepared and electrolytically welded together. The weld metal is thereafter dressed down to the plane of the adjacent parts of the belt while the temporary fastening is still in place. The temporary fastening is then removed and the dressed-down side of the weld and the adjacent parts of the belt are temporarily and firmly fastened in place for dressing down the other side of the weld. The other side of the weld is then dressed down to the plane of the corresponding side of the belt. This temporary fastening is removed and the solder or other fastening medium is cleaned from the surface of the belt. Finally the surface of the weld and, if desired, the entire casting surface is polished or otherwise treated to give the belt a uniform surface finish throughout its length.

The belt of the present invention and the above-mentioned process by which such a belt may be produced, will be further described with reference to the accompanying drawings, in which.

Formation of the strip

Figure 1:
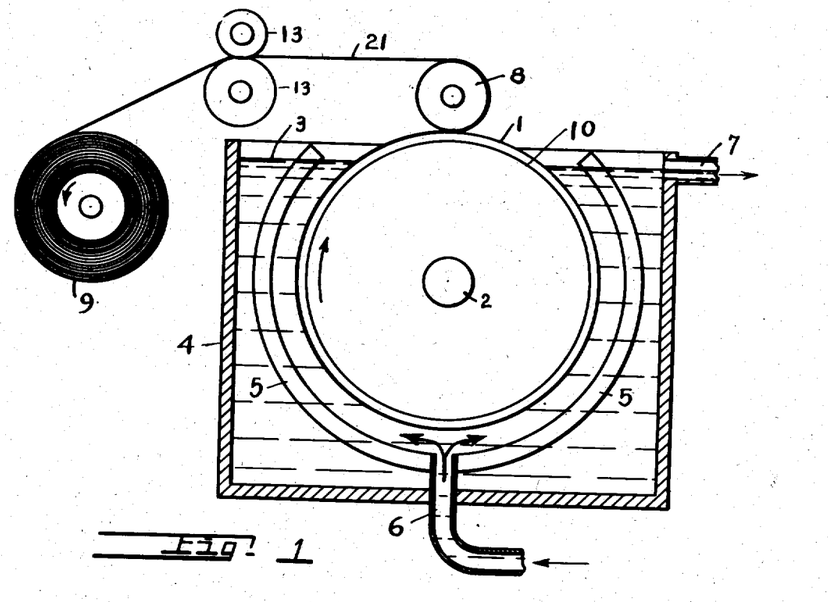
Figure 1 is a diagrammatic view showing an apparatus for electrolytically forming a continuous metal strip of the desired width and thickness.
Figure 2:
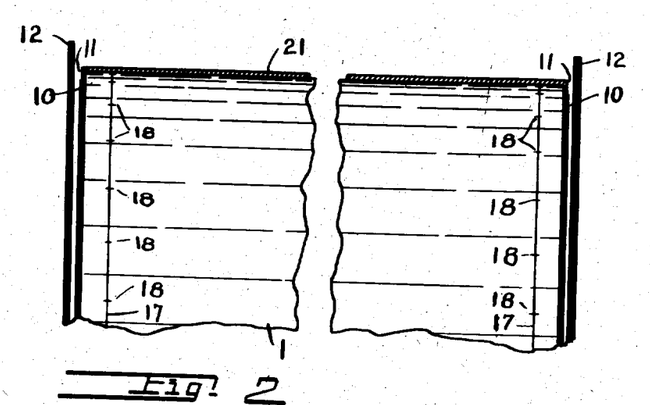
Figure 2 is a detail view of portions of the apparatus shown in Figure 1.

The first step in the manufacture of the belt of the present invention is the formation of a suitable nickel strip from which the belt may be formed. This is illustrated in Figures 1 and 2. A polished cylindrical cathode 1 is rotated on its journals 2, at a constant, suitably slow speed, by conventional driving means, not shown. Before use, this cathode, if made of steel containing considerable percentages of chromium, may advantageously be prepared by anodic cleaning and scrubbing in a hot solution of alkali, followed by rinsing with water, pickling with concentrated nitric acid, and rinsing. This cathode is then partially submerged in a nickel plating bath 3 of suitable composition contained in a tank 4. Anodes 5 are placed around this cathode. These anodes are enclosed in bags, not shown, in a known manner, and are preferably spaced substantially parallel to the cathode surface to substantially enclose the space adjacent said surface. A conduit 6 is provided for continuously introducing the plating solution at the bottom of this space. The solution flows from this space into the tank 4 through restricted areas near the ends of the cathode and washes out foreign matter which might interfere with the uniform deposition of metal on the cathode. An overflow 7 is provided in the tank 4 through which the solution is returned to a reservoir, not shown, from which it is recirculated by a pump, not shown, and returned, after being suitably filtered, through conduit 6 to the space between cathode 1 and anodes 5.

As the cathode 1 rotates in the direction indicated by the arrow, nickel is continuously deposited thereon until, by suitable regulation of cathode speed and current density, it emerges from the surface of bath 3 at the time the electrodeposited layer has reached the desired thickness. As rotation continues, the electrodeposited layer, the strip 21, is stripped from the cathode under a positively driven roll 8 and is passed to a receiving reel 9 over one or more guide rollers if desired.

Nickel belts, in order to possess the greatest utility for the purposes described, should have a good degree of strength, hardness, and ductility. Tensile strength of at least 80,000 to 100,000 pounds per square inch is desirable together with Vickers hardness of 160 or more, and elongation of not less than about 4 to 8 per cent in two inches. Such deposits can be made from a modified Watts type of nickel plating bath containing formate ions, by suitably controlling the temperature, hydrogen ion concentration, ratio of formate to total nickel, and degree of agitation in the bath, and the current density used in the deposition, all in accordance with the properties specified for the deposit. The adjustments used for control are ordinarily to be made within the following approximate ranges: temperature, 110 to 160 degrees F.; pH, 2.0 to 3.5; ratio of formate to total nickel content, 0.1 to 0.5; agitation from moderate to strong; and cathode current density, 30 to 120 amperes per square foot. For example, a deposit of over 125,000 pounds per square inch tensile strength, with satisfactory hardness and ductility, can be obtained by deposition at a current density of about 60 amperes per square foot and a temperature of about 140 degrees F. from a vigorously agitated solution wherein the ratio of formate to total nickel is about 0.280 and the pH about 2.70. If greater hardness and tensile strength are desired, they can be secured by making one or more of the following adjustments: increasing the ratio of formate to total nickel in the bath, increasing the value of the pH, decreasing the current density, and increasing the degree of agitation. If, on the other hand, greater ductility with lesser strength and hardness are desired, they can be secured by making the opposite adjustments.

This method of securing nickel deposits of specified physical properties is the invention of but one of the present inventors and is set forth in detail and specifically claimed in the application of William B. Stoddard, Jr., Serial No. 639,869, entitled "Electrodeposition of Nickel," filed concurrently herewith, now Patent No. 2,533,532, dated December 12, 1950.

As wider and thicker strips are formed and as the conditions of deposition are controlled to increase the strength and hardness of the deposit, increasing difficulty is encountered with lack of flatness in the electroformed sheet. There is observed an increasing tendency for the strip to curl away from the surface which was in contact with the cathode, in a direction parallel to the length of the strip. There is also an increasing waviness of the edges due apparently to a greater length of the strip at the edges than in the center. The apparent cause of these characteristic types of deformation has now been discovered in the rate and varying direction (relative to the cathode surface) of shrinkage of metal in different parts of the strip. It appears that the shrinkage is not deferred until the full thickness of the deposit has been reached, but the earlier deposited metal apparently shrinks while more metal is being deposited thereon. The edges of the strip shrink towards the center or axis of the strip while the center shrinks towards the later deposited metal, i. e. towards the thinner section, in a direction opposite to the direction of rotation of the cathode. Shrinkage stresses and strains thus produced are locked up within the metal and apparently constitute the primary cause of the deformations described.

When the width and thickness of the strip and its strength and hardness are such that these defects become troublesome, they may be largely overcome by controlling the rate and direction of shrinkage. For this purpose the construction illustrated in Figure 2 has been found effective. The cathode 1 is protected from electrodeposition on its ends by insulation 10 on each end thereof. This, as shown in the figure, covers an area slightly smaller in diameter than the cathode itself, exposing on each end an annular area of cathode surface which is continuous with the cylindrical surface on which the nickel strip is electroformed. Accordingly, downturned edges 11 are formed along each side of the strip 21, which is thereby prevented from shrinking laterally while on the surface of the cathode and constrained to shrink only in a longitudinal direction. The shrinkage thus appears to be uniform in direction and amount across the entire width of the strip, thus substantially preventing the deformations described. Before the strip 21 can be wound into roll 9, the down-turned edges 11 should be removed, as by shear rolls 13, to leave the strip smooth and flat.

It has been found further that these downturned edges 11 can be held to a minimum by the provision of non-conducting baffles 12 (not shown in Figure 1) located in close proximity (e. g. not over 1/8 inch) to the ends of the cathode surface. By extending them as illustrated in Figure 2, for a considerable distance (e. g. 2 inches or more) beyond the circumference of the cathode, undue building up or thickening of the edges of strip 21 can be also be prevented.

If belts of considerable length are required so that it is necessary to repeatedly deposit nickel onto and strip the deposit from each part of the cathode surface, a serious sticking of the deposit to the cathode surface occurs with the usual chromium or chromium-containing cathodes such as those of stainless steel. As particularly described and claimed in a co-pending application, Serial No. 538,537, entitled "Cathode" filed June 2, 1944, by William B. Stoddard, Jr., one of the present applicants, and now abandoned, these difficulties due to sticking may be obviated by the addition of molybdenum to the steel of which the cathodes are formed. Hard nickel deposits have been repeatedly made on and stripped from a cathode formed of the so-called 18-8 type of stainless steel to which from 1 to 10 per cent of molybdenum has been added, for more than fifty times without damage due to sticking.

Figure 3:
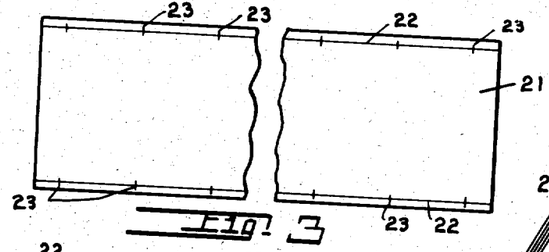
Figure 3 is a plan view of a metal strip having the preferred type of alignment marking.
Figure 5:
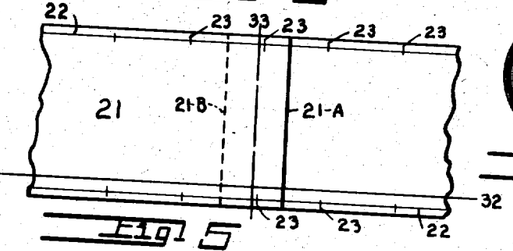
Figure 5 is a fragmentary plan view showing the alignment of the ends of the strip preparatory to trimming and welding.

In order to form an endless belt which is satisfactory and will run true over properly aligned pulleys, it is essential that the ends of the strip be properly aligned prior to being joined. For the purpose of facilitating the alignment operation, it is desirable to have accurately located reference marks on the strip. We have found that such marks may be made in the exact locations desired at the time of formation of the strip, if suitable marks are provided on the surface of the cathode. Extremely fine lines are advantageously engraved on the cathode surface. These appear on the electrodeposited strip as fine raised lines which are soon worn off, or may be readily polished off after they have served their purpose. One form of marking which we have found useful is illustrated in Figures 2, 3, and 5. Circumferential lines 17 are scribed around the cathode near the location of the edges of the strip. These are crossed at preferably regular intervals by short lines 18 which are aligned across but do not extend across the surface. They are advantageously but not necessarily parallel to the axis of the cathode. On the finished strip these lines appear as lines 22 near and parallel to the edges of the strip and short cross lines 23, as illustrated in Figure 3.

Figure 4:
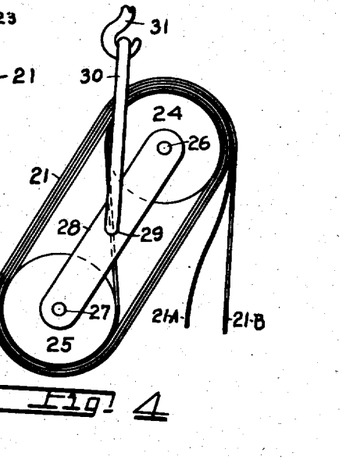
Figure 4 is an elevational view of the reel on which the metal strip is wound for storing and handling.

The strip 21, if long, is advantageously handled by winding on a double reel as illustrated in Figure 4. The metal strip 21 is wrapped at its central portion around a roll 24 of such diameter that the stresses in the belt when bent to that curvature are materially below the elastic limit of the metal. From the roll 24 the two ends of the strip are passed around a similar roll 25 and the double thickness of belt is then wound around both rolls as shown in the figure. The rolls 24 and 25 are advantageously rotatably mounted on their respective axes 26 and 27 which are supported by cross bars 28 which in turn may be pivotally supported at 29 on a yoke 30 which is adapted to be carried by any suitable means such as a hook 31 on an overhead crane or hoist. The surplus length of the metal strip 21 is advantageously wound and stored on this reel during the operations of joining the ends as hereinafter described.

*Aligning, trimming, and fastening the ends*

The next step in the process is to trim and align the ends and fasten them in the relative positions which they are to occupy in the completed belt. The alignment may be accomplished in accordance with any of the known methods desired. It may, however, be advantageously and in general more accurately accomplished with the aid of the reference marks 22 and 23, either by aligning the marks 22 for a considerable distance on each of the ends 21A and 21B of strip 21 to correspond with an accurate straight edge (such as, for example, a fine wire 32 held under tension), or by aligning the marks 22 on the end 21A with the corresponding marks 22 on the end 21B and adjusting the angularity of the ends until adjacent marks 23 on the opposite ends of the belt are, by accurate measurement, found to be the same distance apart. In either case, when using reference marks 22, 23, the alignment or measurement is advantageously checked by means of a suitable microscope in a known manner in order to secure accuracy of alignment and consequently a truly running belt.

The ends 21A and 21B of strip 21 may be trimmed square before alignment as described, or they may be overlapped as shown in Figure 5 during the alignment procedure described. In the latter case, the ends are then held firmly in the aligned position by any suitable means and both ends are cut through simultaneously as on line 33, thus automatically securing an accurate fitting together of the ends when the alignment is correct.

While the ends of the strip have been illustrated and described as cut square, to make a joint which will extend across the belt at right angles thereto, this is not necessary in the present invention. It may in some cases be desirable or convenient to cut the ends of the strip at acute angles with the axis of the strip. In such cases it is advantageous to cut the overlapping end simultaneously as indicated in Figure 5, except that the cut is made at an acute angle instead of square across on line 33.

After aligning and trimming, the ends 21A and 21B to be joined are temporarily but rigidly fastened in the relative positions which they are to occupy in the finished belt. They may be thus held in any desired manner but are advantageously soldered or otherwise cemented flat onto a relative rigid metallic block or bar 31 shown in Figure 6. Bar 41 has flat portions 42, 42 which are carefully formed in the same plane and are separated by a wide flat V groove 44. The extremities of the ends 21A and 21B of the metal strip 21 are bent downwardly into the V groove, the depth of which is sufficient that the upper surfaces of said extremities lie definitely below the level of the lower surface of the coplanar portions of the ends 21A and 21B soldered to the flat surfaces 42, 42. The soldering is advantageously accomplished by interposing a reticular member such as wire cloth with the solder at 45 between the ends 21A, 21B, and the surface of the block 41, holding the parts in position, fusing the solder, and then holding the parts together under high pressure until the solder has solidified. This process is described in greater detail and specifically claimed in the co-pending application of William B. Stoddard, Jr., for patent Serial No. 639,868 entitled "Soldering Method for Positioning Strip Material" filed concurrently herewith, now Patent No. 2,530,552, dated November 21, 1950.

In order that the welded joint and adjacent parts of the strip may be smooth and flat and free from distortion, it is necessary that the soldering operation be carefully done. The strip should be heated evenly for some distance back from each of the ends. The difference of temperature per unit distance through the metal should not be allowed to rise at any point to a degree which would cause permanent distortion. Properties and dimensions of such hard nickel strips may become permanently altered at temperatures over about 350 to 400° F., so, to maintain uniformity throughout, the entire strip may be heat-treated at the soldering temperature, or this may be held below the above limit. If this is desired, a solder or other cementing medium of suitably low melting point should therefore be used. Further, any material strains, particularly compressive strains, in the strip when it is soldered in place for welding, should be avoided. Care should therefore be taken to see that ends 21A and 21B of the strip have expanded substantially equally with or slightly more than bar 41 at the time of soldering, so that after the solder has solidified they may shrink together without causing a deleterious degree of strain, and advantageously leave the ends of the strip under sufficient tension to compensate for the subsequent shrinkage of the weld metal.

Welding the ends together

After the ends 21A and 21B have been soldered firmly and accurately on the block 41, the space between the ends at the bottom of the V is cleaned of foreign matter and filled with an electrically conducting filler 46 such as solder or a non-metallic conductor as for example a phenol formaldehyde varnish containing sufficient graphite to give it the desired conductivity. Care should be taken that the surface of the filling 46 be free from pits, cracks, and holes, and that there be no cracks, crevices, or surface irregularities left where it joins the metal of the belt 21, so that the wide, flat, V-shaped trough 47, for the reception of weld metal, is provided with a continuous electrically conducting surface.

Figures 6, 7:
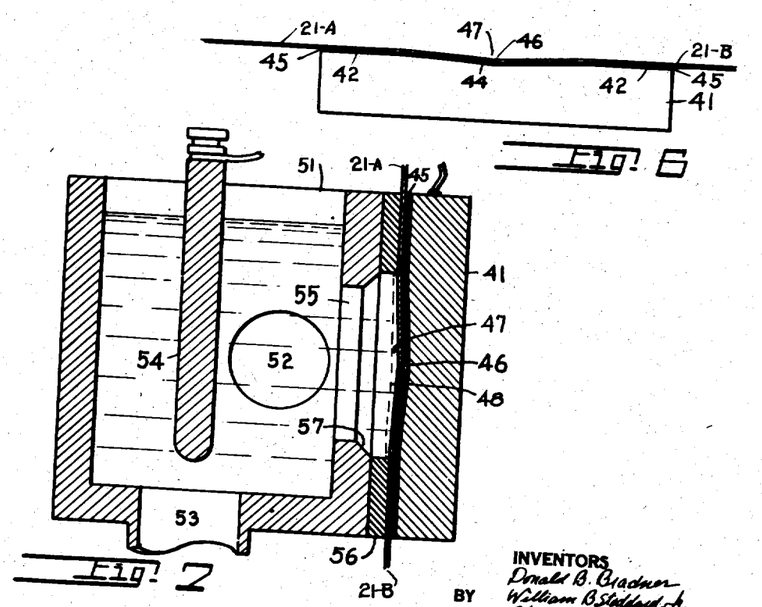
Figure 6 is an edge view of the ends to be joined, as fastened in their relative positions in preparation for the welding operation.
Figure 7 is a sectional view of the electrolytic cell used for the welding operation, showing the parts to be joined in place in the cell.

The surface of the strip 21 in and immediately adjacent the trough 47 is then made an electrode in an electrolytic cell. One convenient method by which this may be accomplished is illustrated in Figure 7. The cell used is formed in a tank 51 made of non-conducting substance such as laminated phenol formaldehyde resin, having an inlet at one end and an outlet at the other end. An electrode 54 is located in the cell as hereinafter described, and a window 55 is provided in the opposite wall. With an interposed gasket 56 of rubber or the like, the trough 47 formed by the bent ends 21A and 21B soldered onto bar 41, is clamped against the wall of cell 51 at the window 55. The opening in gasket 56 is slightly wider than the V trough 47, exposing a short length of the flat surface of the belt at each side of the trough 47. The corners of the window 55 are advantageously bevelled as shown at 57 so that the wall overhangs the edges of the exposed area of the belt in order to prevent excessive building up or "treeing" of the electrolytically deposited metal at the edges of the weld. Inlet 52 is advantageously placed so that incoming solution sweeps across the surface of trough 47. An outlet 53 is advantageously provided in the bottom so that solutions and sediment can readily be drained and flushed from the cell.

With the cell set up as described, the surface of the belt exposed through window 55 must be further prepared so that the weld metal electrolytically deposited thereon will adhere with a strength substantially equal to the strength of the metal itself in spite of the presence of any solder which may have been used at 46. In the case of a nickel belt this preparation may be accomplished as follows: For this purpose the preferred treatment is that fully described and claimed in a co-pending concurrently filed application Serial No. 639,870 entitled "Method of Forming a Strongly Adherent Electro Deposit," now Patent No. 2,533,533, dated December 12, 1950. For the accomplishment of this process the cell is filled with a concentrated (not over 60 per cent water) solution of sulphuric and phosphoric acids, wherein the volume of sulphuric acid is advantageously from 2 to 3 times that of the phosphoric acid. The metallic surface of trough 47 exposed through window 55 is made anode, while a lead or nickel cathode is used at 54. A potential somewhat over 6 volts, e. g. about 7.5 volts, is used for not less than about 3 minutes. If this is followed by treatment at about 3 volts for 3 more minutes, the nickel surface will be covered with a reddish brown deposit where it is prepared for reception of an adherent deposit, indicating that the preparation has been accomplished. The acid is then removed from the cell, the surface and cell are thoroughly rinsed, a nickel anode is placed at 54, the cell is filled with nickel plating solution, and nickel is electro-deposited until the trough 47 is filled with weld metal as indicated by broken line 48 in Figure 7. If the belt is desired to have substantially uniform physical properties throughout the weld and the strip itself, the plating solution and the conditions of deposition advantageously duplicate, as closely as possible, the solution and conditions used in electroforming the strip.

This method of electrolytic welding and the welded structures produced thereby are fully described and specifically claimed in our co-pending concurrently filed application Serial No. 639,867 entitled "Joining Metal Parts." Accordingly no claim is herein made to said welded structure or welding process separate and apart from the novel endless belt herein described and claimed as an article of manufacture having a characteristic form and distinctive properties, and from the method of making the same.

Dressing down the weld

Figure 8:
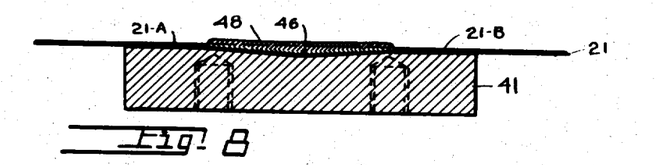
Figure 8 is a sectional view of the completed weld after removal from the cell but prior to removal of surplus weld metal.

When an adequate thickness of weld metal has been deposited as indicated at 48 in Figures 7 and 8, the bar 41 carrying the welded structure is removed from the electrolytic cell and appears as illustrated in Figure 8. Before loosening the welded ends 21A and 21B from the bar 41, it is desirable that the protruding parts of the weld be dressed down to the level of the adjacent portions of the surface of the belt. This may be accomplished by hand or by any type of mechanism desired, in accordance with known methods. When, however, the belt is of considerable width and the welded joint is consequently long, we find it convenient to use the device described in the co-pending application for patent Serial No. 639,872, entitled "Grinding Device" filed concurrently herewith, now Patent No. 2,479,095, dated August 16, 1949. As therein more fully described, a considerable section of the belt 21 on each side of the weld 48 is supported on an extremely rigid and plane surfaced base plate 61 which is notched at 62 to receive the bar 41 supporting the weld. The grinding device 63 itself is mounted on a carriage 64 which is arranged to operate on tracks 65 which are adapted to rest on the belt 21 where it is supported on said base plate 61 and to be clamped to the base plate and thus hold the belt firmly thereon. When so clamped, the tracks guide the grinding device in a plane path accurately parallel to the surface of said base plate. Means 66 are also provided for adjusting the bar 41 to which the belt adjacent the weld is soldered, to bring the belt surface adjacent the weld accurately into parallelism with the plane of travel of the grinding device and positively hold it in that position until the grinding operation is completed. By means of conventional driving mechanism, not shown, and cross feed device 67 and vertical feed 68, the grinding device is caused to traverse the entire area of the weld 48 and remove all weld metal lying above the plane of the adjacent surfaces of belt 21 as indicated by the broken line in Figure 8.

When the protruding weld metal has been ground off and the surface is accurately in the plane of the adjacent belt surface the belt 21 is removed from the block or bar 41 on which the ends were fastened for the welding and grinding operations. In case the ends 21A and 21B, joined by welding, have been bent out of the plane of the adjacent parts of the belt as illustrated in Figures 6, 7, and 8, there is a protrusion from the reverse surface of the belt, which must also be removed. For this purpose, the freshly ground surface of the belt can be fastened to a flat surfaced block or bar 71 (see Figure 10), advantageously by soldering with a reticular member interposed at 72 as described. The protruding metal can then be ground off to the plane of the adjacent belt surface as indicated by the broken line in Figure 10. This also may be conveniently accomplished by use of the grinding device illustrated in Figure 9 and described in connection therewith.

Figures 11, 12:
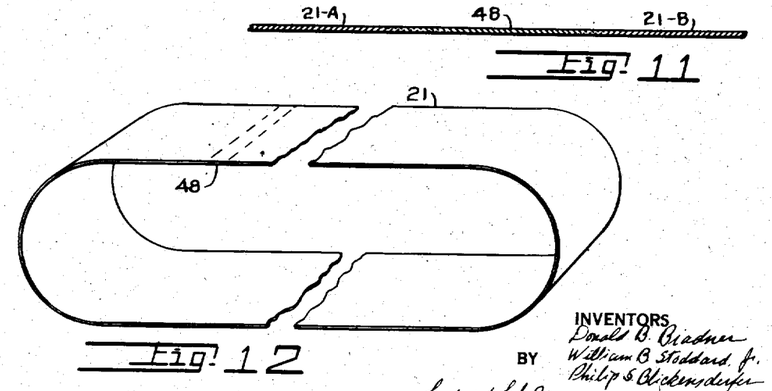
Figure 11 is a sectional view showing the finished weld joining the ends of the metallic strip to form it into an endless belt.
Figure 12 is a perspective view showing the belt of the present invention with parts broken away, with the location of a weld indicated by broken lines and with the supporting pulleys not shown.

After grinding is completed and the welded portion of the belt has substantially the same thickness throughout as has the belt itself, as illustrated in Figure 11, the ground portion may be polished or given any other finish to correspond with the adjacent belt surface, or the entire surface of the belt, including the weld, may be given any type of finish desired.

If the preparation of the surface to receive the weld metal has been properly carried out, as described, the weld metal will be bonded to the base metal with a bond which is substantially equal in strength and other physical properties to both the weld metal and the metal of the belt. If, further, the conditions of electrodeposition of the strip and of the weld metal joining the ends of the strip have been similarly controlled to give deposits of the same physical properties, the structure will be substantially homogeneous throughout the strip and the weld metal. The weld metal 48 having been electrodeposited on the inclined sides of trough 47 (Figures 6, 7, and 8) possesses a structure which is correspondingly inclined to the structure of the metal in the other parts of the belt which, as hereinbefore described, was deposited on a surface parallel to the final surface of the belt. In addition to this difference in orientation of structure, there may be other differences of structure due to such differences as may have existed between the deposition of the weld metal and that of the strip, in respect to composition, temperature, concentration, and purity of the electrolytic bath, the rate and conditions of deposition, etc. However, if the process has been carefully carried out in accordance with the foregoing instructions, any differences in structure which may exist between the metal of the strip and that of the joint will be too small to be identified except by metallographic study, but under certain conditions may be manifested as a slight difference in reflection of light from the surface when viewed at certain angles, which it is thought may be due to differences in crystal orientation.

It will be noted that in the drawings (Figures 8, 10, and 11) where the belt and weld are shown in section, the section lining of the weld metal is in a different direction from that of the belt metal joined thereby, in order to indicate the location of the weld metal. No lines are drawn, however, to separate weld metal from the welded parts because the structure is substantially homogeneous throughout and such lines would be misleading.

It is thus seen that the belt 21, illustrated in Figure 12, produced in accordance with the preferred form of the present invention as described, is substantially straight and flat and will run truly over properly aligned pulleys. It is of substantially uniform thickness, hardness, strength, stiffness, and other physical properties, throughout. It is substantially free from internal stresses such as are caused in fusion welding, brazing, etc. by localized or uneven heating. Because the metal of the belt has all been electrodeposited in place, the belt is more uniform in thickness than are commercially rolled or drawn strips. The structure is substantially homogneous throughout, and it does not exhibit the marked "grain" characteristic of rolled or drawn metals. The outer surface is hard and bright and exhibits the characteristics of a metal surface electroformed on a polished non-adhering cathode. If the belt is to be used in the manufacture of cast films or of cast surfaced coated paper, it is given a uniform surface finish, most often a high polish, and usually on the outer surface, which finish is unmarred by the presence of a joint in the metal. The location of a weld is indicated in Figure 12 by broken lines, which however only indicate the location, no corresponding lines being actually present on the surface, although sometimes electrolytic welds of the type described may under certain light conditions appear as lighter or darker areas on the surface.

*Example*

Figure 9:
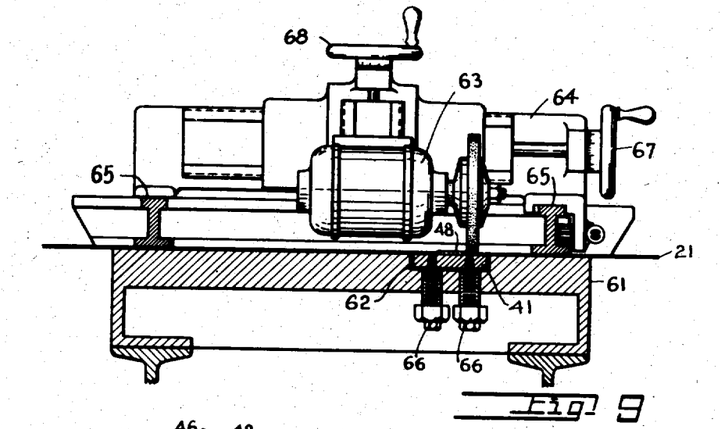
Figure 9 is a view, partly in section, of one type of grinding device for removing the surplus weld metal.
Figure 10:
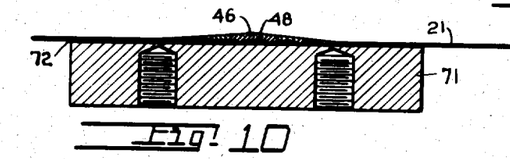
Figure 10 is a sectional view of the welded joint fastened in place for grinding excess metal from the reverse side of the weld.

The following example, taken from actual practice, will serve to illustrate the process described: for forming the strip there was provided a rotating cylindrical cathode about 4 feet in diameter and slightly over 6 feet long, composed of an 18-8 type of stainless steel with added molybdenum, the analysis of which as given by the maker was: Carbon 0.10 max., manganese 2.00 max., silicon 0.75 max., chromium 18.00-20.00, nickel 14.00 max., molybdenum 2.00-3.00. Near each end of this cathode a fine circumferential line was lightly engraved into the polished cylindrical surface. These lines were crossed at regular intervals by short lines approximately parallel to the axis of the cylinder and aligned but not extending across the surface of the cathode. The cathode was prepared as described, and a layer of nickel approximately 0.010 inch thick was continuously deposited thereon from a modified Watts type of bath of substantially the following composition:

|  | Grams per liter |
|---|---|
| Nickel sulphate (7H$_2$O) | 185 |
| Nickel chloride (6H$_2$O) | 45 |
| Nickel formate (2H$_2$O) | 30 |
| Boric acid | 30 | at a pH of between 2.5 and 2.6, and temperature of 140° F. A moderate degree of agitation was used, and the current density was maintained at a value of approximately 60 amperes per square foot. The control of conditions as described yielded a hard nickel deposit having a tensile strength well over 100,000 pounds per square inch and a ductility at least equal to that indicated by 8 per cent elongation in two inches, and which lay satisfactorily flat after stripping from the cathode. This layer was continuously stripped from the cathode as it reached the desired thickness, and the process was continued indefinitely. A piece 150 feet long was cut from the resulting strip and wound on a double reel as described. The ends were trimmed off in accordance with the cross lines transferred to the strip from the cathode, and the trimmed ends were then abutted. With the aid of a microscope the longitudinal lines at the edges of the opposed ends were aligned and the cross lines measured and the angularity of the opposed ends of the strip adjusted until adjacent cross lines on the opposite edges were separated by the same distance. Using the precautions described, the opposed ends were then soldered down on a block with an interposed layer of wire cloth and with the ends bent down into a V-shaped groove in the block so that at the joint the upper surfaces were below the plane of the lower surfaces of the unbent portions, and the space between the ends was filled with solder at 46 as illustrated in Figure 6. An electrolytic cell was formed around the parts in a manner similar to that illustrated in Figure 7. The electrolytic preparation of the ends and the electrodeposition of weld metal were then carried out as described. The electroplating solution used was analagous to that used in the formation of the metal strip and the conditions of electrodeposition were similarly controlled to yield weld metal having physical properties substantially the same as those of the strip. The parts when removed from the cell appeared as shown in Figure 8, and the surplus weld metal was then ground down to the level of the surface of the belt in the manner illustrated in Figure 9. The joined ends of the belt were then removed from the block to which they had been soldered, and the flat ground surface was soldered to a flat block with interposed wire cloth as shown in Figure 10. This was placed in the grinding device as shown in Figure 9 and the excess nickel ground down to the level of the belt surface, making the joint appear as in Figure 11. The outer surface was then polished and the belt appeared as illustrated in Figure 12. The finished belt was substantially straight and flat, approximately 6 feet in width, and 0.010 inch in thickness, and so far as detected did not vary from this thickness by more than 0.00025 inch, plus or minus. So far as could be determined, the physical properties were uniform throughout both belt and weld metal, and the location of the weld could only be determined by careful examination. The belt was straight and ran true over carefully aligned pulleys. It was found to form an excellent casting surface for use in the production of cast surfaced coated paper.

Nickel belts, as described, have been found to have an especial utility as casting surfaces in the manufacture of certain types of cast surfaced coated paper, and constitute a preferred type of casting surface for this purpose.

While the invention is especially adapted to, and has been described as embodied in, the formation of nickel belts, iron, nickel, cobalt, and alloys of two or more of these metals behave much alike in this process, which can also be used without fundamental change to form belts of other metals. It will be understood, however, by those skilled in the art that the preparation and electrodeposition processes should then be adapted to the specific metal being used.

Although it is not essential, it is ordinarily desirable that the weld metal be of the same composition as that of the strip as the homogeneity of the structure and the uniformity of the surface are thereby improved.

The term "metal" as used in the present specification and claims is to be understood as referring to those materials which are metals in the metallurgical sense and not to those which are metals in the chemical sense only.

By the term "nickel" it is not meant to restrict the composition to chemically or even commercially pure nickel, since various impurities or alloying elements may be present, sometimes to a considerable extent, without impairing the utility of the device. The use of cobalt as an alloying element is, it has been found, frequently advantageous in facilitating the electrodeposition. "Nickel belts" therefore are to be understood to be belts which are composed largely of nickel or which owe their physical characteristics largely to this metal.

We claim:

1. Electrolytic method of making an endless nickel belt of substantially uniform thickness and physical properties throughout, which comprises: electrolytically forming a strip of nickel on a continuously moving cathodic surface having reference marks engraved thereon, said electrolytically formed strip having reference marks formed integral therewith by electrolytic deposition over said marks on the surface of said cathode; trimming, abutting, and aligning the ends of said strip in accordance with said reference marks thereon; displacing the extremities of said ends completely from the plane of the adjacent portions of said strip by a slight bending of said strip near its ends; temporarily but firmly fastening said ends in said abutted, aligned, and in part displaced position, to a relatively rigid member; filling the space between said ends flush with their surfaces, with electrically conducting material; then, while said ends are so fastened, electrolytically preparing the surfaces thereof so that nickel electrodeposited thereon will be strongly adherent thereto, and electrolytically depositing nickel on and between said ends to form an electrolytic weld uniting them, controlling the deposition both of the nickel in the strip and of that joining the ends thereof, to yield deposits of substantially the same physical properties; and thereafter mechanically removing surplus weld metal until the joint has substantially the same thickness as and lies in the same plane with the adjoining parts of the belt.

2. Method of making a wholly electrodeposited endless flexible metal belt which is substantially free from wavy edges and from a tendency to curl, which comprises: progressively forming a metal strip by electrolytic deposition on a metallic cathode; constraining the shrinkage to take place longitudinally of the strip by depositing the metal simultaneuosly across the entire width of the cylindrical surface of the cathode and a short distance over each edge thereof onto the adjacent end surface of the cylindrical cathode; progressively removing the strip from the cathode as it reaches the desired thickness; removing the downturned edges from the strip; trimming and abutting opposite ends of the strip; forming a trough with gently sloping sides for the reception of weld metal where said ends are abutted; firmly fixing the portions of said strip in and adjacent said trough in the relative positions they are to occupy in the finished belt; preparing the metal of said strips where exposed in and adjacent said trough, for the reception of a strongly adherent electrodeposit; and electrolytically depositing weld metal in said trough until said trough is at least completely filled.

3. Method of making an endless flexible metal belt of substantially uniform thickness and strength and substantially free from distorting stresses within the metal throughout its extent, which comprises: progressively forming a metal strip by electrolytic deposition on a metallic cathode; constraining the shrinkage to take place longitudinally of the strip by depositing the metal simultaneously across the entire width of the cylindrical surface of the cathode and a short distance over each edge thereof onto the adjacent end surface of the cylindrical cathode; progressively removing the strip from the cathode as it reaches the desired thickness; removing the downturned edges from the strip; trimming opposite ends of the strip at the same angle with the strip; abutting the trimmed ends; forming a trough with gently sloping sides for the reception of weld metal where said ends are abutted; holding the portions of said strip in and adjacent said trough under a slight lateral tension; preparing the metal of said strips, where exposed in and adjacent said trough, for the reception of a strongly adherent electrodeposit; electrolytically depositing weld metal in said trough until said trough is at least completely filled while the parts are held under said lateral tension; and then releasing said parts.

4. Electrolytic method of forming an endless metal belt, which comprises: progressively forming a metal strip by electrolytic deposition on a moving cathodic surface in which reference marks are engraved; continuously removing the deposit as it reaches the desired thickness, said deposit having raised reference marks formed by deposition in the engraved marks in the cathodic surface; trimming, abutting, and aligning the ends of said strip in accordance with said reference marks; forming a trough with gently sloping sides formed of the metal of the strip, for the reception of weld metal, where said ends are abutted; firmly fixing the portions of said strip in and adjacent to said trough, in the relative positions they are to occupy in the finished belt; providing in said trough a smooth continuous uninterrupted electrically conducting surface on and between said ends; preparing the metal of said strip, where exposed in and adjacent said trough, for the reception of a strongly adherent electrodeposit; and electrolytically depositing weld metal in said trough until said trough is at least completely filled.

5. Electrolytic method of forming an andless metal belt, having substantially uniform physical properties throughout, which comprises: electrolytically forming a metal strip on a polished moving non-adhering cathodic surface under conditions of deposition adapted to give a deposit of the desired physical properties; trimming the ends of said strip; bringing said ends together in opposed relationship; forming a trough for the reception of weld metal by slightly bending the strip near its ends to displace the ends completely from the plane of the belt; filling the space between said ends outside the plane of, and flush with the surface of the bent-down ends of, said belt, across its full width, with electrically conducting material; holding the ends of the strip firmly in this position; preparing the surface of the metal of said strip on and adjacent the sides of said trough, for the reception of a strongly adherent electrodeposit; and electrolytically depositing weld metal in said trough, while the ends are so held, until it is at least up to the upper surface of the strip; said electrolytic deposition being carried out under conditions which substantially duplicate the conditions of deposition of the strip, whereby the properties of the strip and the weld metal will be substantially the same.

6. Electrolytic method of making an endless nickel belt, which comprises: progressively forming a nickel strip by electrolytic deposition on a polished, moving, non-adhering cathodic surface from a bath and under condition of deposition adapted to yield a deposit having a tensile strength of more than 80,000 pounds per square inch; trimming the ends of said strip; abutting said trimmed ends; forming a trough for the reception of weld metal by slightly bending the strip near its ends, to displace the ends completely from the plane of the belt; filling the space between said ends outside the plane of, and flush with the surface of the bent-down ends of, said belt, across its full width, with electrically conducting material; holding the ends firmly in this position by soldering them onto a more rigid member; preparing the surface of the nickel strip in and adjacent said trough for the reception of a strongly adherent nickel electrodeposit, said preparation comprising treatment as anode in a bath of concentrated sulphuric and phosphoric acid; electrolytically depositing nickel in said trough while the ends are so soldered in place, until the trough is at least completely filled, said electrolytic deposition being carried out from a bath and under conditions substantially the same as those used in the deposition of the strip so that both strip and weld metal will be substantially identical in composition and properties.

7. An endless flexible metal belt adapted for use in the manufacture of cast surfaced coated paper and similar operations, characterized by a substantial uniformity of thickness and of physical properties throughout its extent, said belt comprising at least one strip of metal and at least one weld which is composed of metal which is in contact with the strip metal along interfaces which extend completely through, and are slightly and oppositely inclined to the surface of, the belt; the metallographic structure of the metal of said strip being characteristic of metal electrolytically deposited on a cathode substantially parallel to the surface of said strip, and the metallographic structure of the metal of said weld being characteristic of metal electrolytically deposited on and between said inclined interfaces.

8. The belt of claim 7 wherein, at each interface between weld metal and strip metal, the metallographic structure of the strip metal is characteristic of metal electrolytically deposited on a cathode substantially parallel to that interface.

9. The belt of claim 7 in which both strip metal and weld metal are chosen from the class consisting of iron, nickel, cobalt, and alloys consisting of at least two of these metals.

10. The belt of claim 7 in which both strip metal and weld metal are nickel and the belt has at all parts, including the weld, a tensile strength of at least 80,000 pounds per square inch.

11. In the process of making an endless metal belt, which comprises electrolytically forming a strip of metal on a rotating cylindrical cathode; the method of improving the flatness of the strip, which comprises constraining the shrinkage of the deposited metal to take place longitudinally of the strip by locking the deposit, as it is formed, over the edges of the cathode surface, said locking being accomplished by protecting the cathode from electrodeposition over a major portion of each end, by insulation which covers an area slightly smaller in diameter than the cathode itself and exposing on each end a narrow annular area of cathode surface which is continuous with the cylindrical surface on which the metal is electroformed, then depositing the metal simultaneously across the entire width of the cylindrical surface of the cathode and downward for a short distance over the edges of the cathode onto and over the adjacent portions of said exposed annular areas on the end surfaces thereof.

12. Method of making an endless nickel belt of substantially uniform thickness and freedom from distorting stresses and substantially uniform strength, in excess of 80,000 pounds per square inch, throughout its entire length, which comprises: progressively forming a metal strip by electrolytic deposition on a rotating cylindrical cathode from a modified Watts type bath having a pH between 2.0 and 3.5 and containing formate ions to the extent of 0.1 to 0.5 times the total nickel in the bath, under conditions adapted to yield a deposit having a tensile strength of over 80,000 pounds per square inch; reducing the tendency of wide flat strips electroformed under such conditions, to curl and develop wavy edges, by constraining the shrinkage of the deposited metal to take place longitudinally of the strip, by depositing the metal simultaneously across the entire width of the cylindrical surface of the cathode and downward for a short distance over the edges thereof; progressively stripping the deposit from the cathode as it reaches the required thickness; trimming the downturned edges from the strip; trimming, abutting, and aligning the opposite ends of the strip; forming a trough for the reception of weld metal where said ends are abutted; electrolytically depositing weld metal in said trough from a bath and under conditions substantially the same as those used in forming said strip; and mechanically dressing down the weld to the thickness of the strip.

13. Method of making an endless metal belt, which comprises: electroforming a metal strip on a rotating cylindrical cathode; constraining the shrinkage of the deposit to take place longitudinally of the strip; said constraint being accomplished by providing on each end of the cathode an insulated area slightly smaller in diameter than the cathode itself, and exposing on each end a narrow annular area of the cathode surface which area is continuous with the cylindrical surface on which the strip is electroformed, and then depositing the metal simultaneously across the entire width of the cylindrical surface of the cathode and over each edge onto the adjacent portion of the exposed annular area; progressively removing the strip from the rotating cathode as the strip reaches the required thickness; and trimming the downturned edges from the strip.

DONALD B. BRADNER.
WILLIAM B. STODDARD, Jr.
PHILIP S. BLICKENSDERFER.

REFERENCES CITED

The following references are of record in the file of this patent:

UNITED STATES PATENTS

| Number | Name | Date |
|---|---|---|
| 880,484 | Edison | Feb. 25, 1908 |
| 901,115 | Metten | Oct. 13, 1908 |
| 1,442,437 | Mather | Jan. 16, 1923 |
| 1,555,840 | Hanley | Oct. 6, 1925 |
| 1,567,079 | Porzel | Dec. 29, 1925 |
| 1,674,941 | Bart | June 26, 1928 |
| 1,710,258 | Hume | Apr. 23, 1929 |
| 1,790,738 | Andren | Feb. 3, 1931 |
| 1,906,376 | Holmes | May 2, 1933 |
| 1,956,233 | Braun | Apr. 24, 1934 |
| 2,026,718 | Weisbert et al. | Jan. 7, 1936 |
| 2,083,527 | Bierer | June 8, 1937 |
| 2,333,567 | Helmore | Nov. 2, 1943 |
| 2,334,699 | Faust | Nov. 23, 1943 |
| 2,370,108 | Pike | Feb. 20, 1945 |
| 2,429,119 | Bloomfield | Oct. 14, 1947 |
| 2,429,902 | Sternfels | Oct. 28, 1947 |

FOREIGN PATENTS

| Number | Country | Date |
|---|---|---|
| 6,061 | Great Britain | 1904 |
| 359,386 | Great Britain | Jan. 20, 1906 |
| 61,411 | Sweden | Feb. 12, 1925 |
| 258,694 | Italy | May 26, 1928 |

OTHER REFERENCES

Journal of the Electrodepositors Technical Society.

Vol. 88 (1945) of Transactions of the Electrochemical Society.

Certificate of Correction

Patent No. 2,569,367                                         September 25, 1951

DONALD B. BRADNER ET AL.

It is hereby certified that error appears in the printed specification of the above numbered patent requiring correction as follows:

Column 6, line 57, for "overlapping end" read *overlapped ends*; line 67, for "relative" read *relatively*; same line, for "bar 31" read *bar 41*; column 12, lines 61 and 62, for "compries" read *comprises*; column 14, line 19, for "andless" read *endless*; column 16, line 66, list of references cited, under "FOREIGN PATENTS", for "Great Britain" read *France*; same column, line 72, under "OTHER REFERENCES" after "Society" and before the period insert , *Vol. 13 (1937)*;

and that the said Letters Patent should be read as corrected above, so that the same may conform to the record of the case in the Patent Office.

Signed and sealed this 4th day of March, A. D. 1952.

[SEAL]

THOMAS F. MURPHY,
                                                        *Assistant Commissioner of Patents.*